US012753081B2

(12) United States Patent
Qu et al.

(10) Patent No.: US 12,753,081 B2
(45) Date of Patent: Oct. 6, 2026

(54) ANODE MATERIAL, PREPARATION METHOD THEREOF AND LITHIUM ION BATTERY

(71) Applicants: BTR NEW MATERIAL GROUP CO., LTD., Shenzhen (CN); Dingyuan New Energy Technology Co., LTD., Huizhou City (CN)

(72) Inventors: Lijuan Qu, Shenzhen (CN); Zhiqiang Deng, Shenzhen (CN); Chunlei Pang, Shenzhen (CN); Jianguo Ren, Shenzhen (CN); Xueqin He, Shenzhen (CN)

(73) Assignees: BTR NEW MATERIAL GROUP CO., LTD., Shenzhen (CN); Dingyuan New Energy Technology Co., Ltd., Huizhou City (CN)

(*) Notice: Subject to any disclaimer, the term of this patent is extended or adjusted under 35 U.S.C. 154(b) by 754 days.

(21) Appl. No.: 17/623,170

(22) PCT Filed: Oct. 28, 2020

(86) PCT No.: PCT/CN2020/124347
§ 371 (c)(1),
(2) Date: Dec. 27, 2021

(87) PCT Pub. No.: WO2021/083199
PCT Pub. Date: May 6, 2021

(65) Prior Publication Data

US 2022/0259053 A1 Aug. 18, 2022

(30) Foreign Application Priority Data

Oct. 30, 2019 (CN) ........................ 201911046597.2

(51) Int. Cl.
*H01M 10/0525* (2010.01)
*C01B 33/24* (2006.01)

(52) U.S. Cl.
CPC ......... *C01B 33/24* (2013.01); *H01M 10/0525* (2013.01); *C01P 2006/40* (2013.01)

(58) Field of Classification Search
CPC .................. H01M 10/0525; H01M 4/364–583
See application file for complete search history.

(56) References Cited

U.S. PATENT DOCUMENTS

2015/0372292 A1* 12/2015 Yokoi .............. H01M 10/0525 429/231.8
2017/0117543 A1* 4/2017 Park .................. H01M 4/1391
(Continued)

FOREIGN PATENT DOCUMENTS

CN 102292854 A 12/2011
CN 106575751 A 4/2017
(Continued)

OTHER PUBLICATIONS

International Search Report from corresponding International Application No. PCT/CN2020/124347, mailed on Feb. 3, 2021, 6 pages.
(Continued)

*Primary Examiner* — Osei K Amponsah
(74) *Attorney, Agent, or Firm* — Tucker Ellis LLP

(57) ABSTRACT

This application provides an anode material, a preparation method thereof and a lithium ion battery. The anode material comprises $SiO_x$ and $Li_2Si_2O_5$, wherein $SiO_x$ is dispersed in $Li_2Si_2O_5$, and wherein $0 \leq x \leq 1.2$. The preparation method comprises the following steps of: mixing a silicon oxide $SiO_y$, a reducing lithium-containing compound and an auxiliary agent, and performing heat treatment to obtain the anode material, wherein the auxiliary agent comprises a nucleating conversion agent or a heat absorbent, and $0<y<2$.
(Continued)

The preparation method provided by this application, by using a nucleating conversion agent or a heat absorbent, can make the lithium silicate in the prepared product is only $Li_2Si_2O_5$ without other lithium silicate phases, and because $Li_2Si_2O_5$ is insoluble in water, the processing stability problems of the pre-lithiated material, such as gas production of slurry, low viscosity, tailing during coating, pinholes and pores after drying the polar plate, are solved.

14 Claims, 2 Drawing Sheets

(56) References Cited

U.S. PATENT DOCUMENTS

| | | | | |
|---|---|---|---|---|
| 2017/0214041 | A1* | 7/2017 | Minami | H01M 4/485 |
| 2020/0035992 | A1* | 1/2020 | Ohsawa | H01M 4/131 |

FOREIGN PATENT DOCUMENTS

| | | | |
|---|---|---|---|
| CN | 106816594 | A | 6/2017 |
| CN | 107112534 | A | 8/2017 |
| CN | 108054366 | A | 5/2018 |
| CN | 109301336 | A | 2/2019 |
| CN | 109524650 | A | 3/2019 |
| CN | 109950510 | A | 6/2019 |
| IN | 201617020836 | A | 8/2016 |
| KR | 20140138109 | A | 12/2014 |
| TW | 201937799 | A | 9/2019 |
| WO | 2016035290 | A1 | 3/2016 |
| WO | 2019065195 | A1 | 4/2019 |
| WO | 2020080452 | A1 | 4/2020 |

OTHER PUBLICATIONS

G. Wen et al., “Effects of P2O5 and sintering temperature on microstructure and mechanical properties of lithium disilicate glass-ceramics”, Acta Materialia, ScienceDirect, Apr. 2007, vol. 55, No. 10, pp. 3583-3591.

* cited by examiner

FGI. 5a

ANODE MATERIAL, PREPARATION METHOD THEREOF AND LITHIUM ION BATTERY

The present application claims the priority of Chinese patent application No. 2019110465972 filed in China Patent Office on Oct. 30, 2019 and entitled "Anode material and preparation method thereof and lithium ion battery", the entire contents of which are incorporated in the present application by reference.

TECHNICAL FIELD

The present application belongs to the technical field of battery material, and relates to an anode material, a preparation method thereof and a lithium ion battery.

BACKGROUND

Lithium ion batteries have been widely used in portable electronic products and electric vehicles because of their high working voltage, long cycle life, no memory effect, small self-discharge and environmental friendliness. At present, commercial lithium ion batteries mainly use graphites anode material, but its theoretical specific capacity is only 372 mAh/g, which cannot meet the demand of high energy density for future lithium ion batteries. Although the theoretical capacity of the existing Si is as high as 4200 mAh/g, its expansion is up to 300%, which affects the cycle performance and restricts the market promotion and application. The corresponding silicon-oxygen material has a better cycle performance, but the initial efficiency is low. When charging for the first time, 20%-50% lithium needs to be consumed for SEI film formation, which greatly reduces the initial coulombic efficiency. With the increasing initial efficiency of cathode material, it is particularly important to improve the initial efficiency of silicon-oxygen material.

At present, an effective way to improve the initial efficiency of silicon-oxygen material is to dope them with lithium in advance, so that the irreversible lithium consumption phase in the silicon-oxygen material can be reacted away in advance. At present, the industrialized method is to directly coat a lithium layer on the surface of the polar plate, so as to achieve the effect of reducing the lithium consumption in the anode. However, this method has high requirements on the operating environment and great potential safety hazards, so it is difficult to realize industrial promotion. In the state of the present technological development, there is a general problem of poor processing performance when the initial efficiency is improved by pre-lithiation at the material end, which is mainly manifested as: serious gas production of a water-based slurry, low viscosity, tailing during coating, pinholes and pores after drying of polar plates, etc. The main reason for this problem is that there are a large number of phases of $Li_2SiO_3$, $Li_4SiO_4$, even $Li_2O$ and $Li_xSi$ in the pre-lithiated material, and these components are easily soluble in water, which shows strong basicity and leads to poor processability.

Therefore, poor processability is still a common problem of pre-lithiated material, and it is also a technical difficulty.

A lithium ion battery, a nano silicon material and a preparation method thereof were disclosed, which includes the following steps: uniformly mixing silicon dioxide, magnesium metal and a dopant according to a specified mass ratio to obtain a mixture; placing the mixture in a high-temperature reaction furnace, introducing an inert gas, heating to a specified temperature at a specified heating rate, reacting at a high temperature for a period of time, and naturally cooling to room temperature to obtain a reaction product; taking out the reaction product, carrying out preliminary water washing, acid washing, water washing again and drying to obtain coarse-grained silicon; uniformly mixing the coarse-grained silicon and a dispersant according to a specified mass ratio, grinding for a specified time according to a specified grinding process, drying and sieving to obtain nano silicon. Although the rate performance and cycle performance of the one obtained by this method are acceptable, the initial efficiency and processing performance need to be improved.

Another method for improving the performance of a silicon anode material of a lithium ion battery were disclosed, which includes the following steps: (1) preparing a anode of a silicon monoxide composite material: 1) weighing a certain amount of SiO powder, pouring it into deionized water whose mass is 10 times that of SiO, and then adding a certain amount of graphite and glucose; 2) putting the mixed solution into a high-energy ball mill for ball milling; 3) putting the ball-milled precursor material into a tubular furnace; 4) taking out the prepared SiO/C composite material, and mixing it with conductive agent acetylene black and binder PVDF according to a certain proportion; (2) performing pre-lithiation treatment on the electrode. The initial efficiency and processing performance of the one obtained by this method cannot meet the market demand.

Another silicon-based anode plate, a preparation method thereof and a lithium ion battery were disclosed. The anode coating of the silicon-based anode plate provided by this application includes a first coating on a current collector and a second coating on the first coating, wherein the active substance in the first coating includes silicon-based anode material, the active substance in the second coating does not contain the silicon-based anode material, and the surface of the second coating contains lithium. The preparation method includes: 1) coating a first slurry containing a silicon-based anode material on a current collector to form a first coating; 2) forming a second coating on the first coating by using a second slurry which does not contain the silicon-based anode material; 3) pre-doping lithium on the polar plate containing the second coating to obtain the silicon-based anode plate. The method has a long and complicated process, thus is difficult to be applied in industry.

SUMMARY

Therefore, the purpose of the present application is to provide an anode material with excellent processing performance after pre-lithiation, a preparation method thereof and a lithium ion battery.

For this, the present application adopts the following technical solution:

In a first aspect, the present application provides an anode material including $SiO_x$ and $Li_2Si_2O_5$, wherein the $SiO_x$ is dispersed in the $Li_2Si_2O_5$, and wherein $0 \leq x \leq 1.2$.

The lithium-containing compound in the anode material provided by the present application is $Li_2Si_2O_5$ and because $Li_2Si_2O_5$ is insoluble in water, the processing stability problems of the pre-lithiated material, such as gas production of slurry, low viscosity, tailing during coating, pinholes and pores after drying the polar plate, and the like, can be fundamentally solved. No additional surface treatment is needed for the pre-lithiated material, which can avoid the problems of capacity reduction and initial efficiency reduction of lithium batteries due to surface treatment.

In a preferred embodiment, the anode material satisfies at least one of the following conditions a to d:

a. a pH value of the anode material meets 7<pH<10.7;

b. an average particle size of the anode material is 5 μm-50 μm;

c. a mass ratio of the $SiO_x$ to the $Li_2Si_2O_5$ in the anode material is 1:(0.74-6.6); and d. the $SiO_x$ is uniformly dispersed in the $Li_2Si_2O_5$.

In a preferred embodiment, the anode material satisfies at least one of the following conditions a to c:

a. a carbon coating layer is formed on a surface of the anode material;

b. a carbon coating layer is formed on the surface of the anode material, and a thickness of the carbon coating layer is 10 nm-2000 nm; and c. a carbon coating layer is formed on the surface of the anode material, and a mass fraction of a carbon element in the anode material is 4%-6%.

In a second aspect, the present application provides a method for preparing an anode material, including the following steps:

mixing a silicon oxide $SiO_y$, a reducing lithium-containing compound and an auxiliary agent, and performing heat treatment to obtain the anode material, wherein the auxiliary agent comprises a nucleating conversion agent or a heat absorbent, and 0<y<2.

The preparation method provided by the present application can make the final pre-lithiated product only has $Li_2Si_2O_5$ but no $Li_2SiO_3$ by adding the nucleating conversion agent or the heat absorbent, thus fundamentally solving the processing problem of the pre-lithiated material and simplifying the preparing process of the pre-lithiated material, that is, no additional surface treatment of the pre-lithiated material is needed, which prevents the problems such as gas production. In addition, the resulting $Li_2SiO_3$ in a high-temperature crystalline phase is directly transformed into $Li_2Si_2O_5$ in a low-temperature crystalline phase by adding the nucleating conversion agent or the heat absorbent, which can avoid the problems such as capacity reduction and initial efficiency reduction of the anode material due to surface treatment.

In a preferred embodiment, the anode material satisfies at least one of the following conditions a to f:

a. a pH value of the anode material meets 7<pH<10.7;

b. an average particle size of the anode material is 5 μm-50 μm;

c. a mass ratio of the $SiO_x$ to the $Li_2Si_2O_5$ in the anode material is 1:(0.74-6.6).

d. a carbon coating layer is formed on a surface of the anode material;

e. a carbon coating layer is formed on the surface of the anode material, and a thickness of the carbon coating layer is 10 nm to 2000 nm; and f. a carbon coating layer is formed on the surface of the anode material, and a mass fraction of a carbon element in the anode material is 4%-6%.

In a preferred embodiment, the method satisfies at least one of the following conditions a to d:

a. a mass ratio of the silicon oxide to the reducing lithium-containing compound is 10:(0.08-1.2);

b. the silicon oxide is silicon monoxide;

c. the silicon oxide has a D10>1.0 μm and a Dmax<50 μm; and d. the reducing lithium compound comprises at least one of lithium hydride, alkyl lithium, metallic lithium, lithium aluminum hydride, lithium amide and lithium borohydride.

In a preferred embodiment, the method satisfies at least one of the following conditions a to h:

a. the nucleating conversion agent comprises at least one of phosphorus oxide and phosphate;

b. the phosphorus oxide comprises at least one of phosphorus pentoxide and phosphorus trioxide;

c. the phosphate comprises at least one of lithium phosphate, magnesium phosphate and sodium phosphate;

d. the nucleating conversion agent is phosphorus pentoxide;

e. a melting point of the heat absorbent is less than 700° C.;

f. the heat absorbent comprises at least one of LiCi, NaCl, $NaNO_3$, $KNO_3$, KOH, BaCl, KCl and LiF;

g. a mass ratio of the silicon oxide to the nucleating conversion agent is 100:(2-10);

h. a mass ratio of the silicon oxide to the heat absorber is 100:(8-30).

In a preferred embodiment, the method satisfies at least one of the following conditions a to d:

a. the heat treatment is carried out in a non-oxidizing atmosphere;

b. the heat treatment is carried out in a non-oxidizing atmosphere; the non-oxidizing atmosphere comprises at least one of hydrogen, nitrogen, helium, neon, argon, krypton and xenon;

c. a temperature of the heat treatment is 300° C.-1000° C.; and d. a time of the heat treatment is 1.5 h to 2.5 h.

In a preferred embodiment, before mixing the silicon oxide $SiO_y$, the reducing lithium-containing compound, and the nucleating conversion agent or the heat absorbent, the method further comprises:

heating and gasifying a raw material of the silicon oxide to generate a silicon oxide gas, condensing and shaping to obtain the silicon oxide $SiO_y$, wherein 0<y<2.

In a preferred embodiment, the method satisfies at least one of the following conditions a to g:

a. the raw material of the silicon oxide include silicon and silicon dioxide;

b. a mass ratio of the silicon to the silicon dioxide is 1:(1.8-2.2);

c. a temperature of the heating and gasifying is 1200° C.-1400° C.;

d. a time for the heating and gasifying is 16 h to 20 h;

e. a temperature for the condensing is 930° C.-970° C.;

f. the heating and gasifying is carried out in a protective atmosphere or vacuum; and g. the shaping comprises at least one of crushing, ball milling and grading.

In a preferred embodiment, the method further comprises:

performing carbon coating on a material to be coated with carbon, wherein the material to be coated with carbon comprises at least one of the silicon oxide and the anode material.

In a preferred embodiment, the method satisfies at least one of the following conditions a to c:

a. the carbon coating comprises at least one of gas-phase carbon coating and solid-phase carbon coating;

b. the carbon coating comprises at least one of gas-phase carbon coating and solid-phase carbon coating, and the conditions of the gas-phase carbon coating are as follows: heating the silicon oxide to 600° C.-1000° C. in a protective atmosphere, introducing an organic carbon source gas, keeping the temperature for 0.5 h-10 h, and then cooling; wherein the organic carbon source gas comprises hydrocarbons, and the hydrocarbons comprise at least one of methane, ethylene, acetylene and benzene; and c. the carbon coating comprises at least one of gas-phase carbon coating and solid-phase carbon coating, and the conditions of the solid-phase carbon coating are as follows: blending the silicon oxide and a carbon source for 0.5 h to 2 h, and then carbonizing the obtained carbon mixture for 2 h to 6 h at 600° C.-1000° C., and cooling; wherein the carbon source comprises at least one of polymers, saccharides, organic acids and asphalt.

In a preferred embodiment, the method comprises the following steps:

heating and gasifying silicon and silicon dioxide in a mass ratio of 1:(1.8-2.2) at 1200° C.-1400° C. in vacuum for 16 h-20 h, condensing at 930° C.-970° C., and shaping to obtain silicon monoxide;

performing carbon coating on the silicon monoxide to obtain carbon-coated silicon monoxide;

mixing the carbon-coated silicon oxide and phosphorus pentoxide according to a mass ratio of 100:(2-10), adding a reducing lithium-containing compound and mixing, and roasting at 450° C.-800° C. for 1.5 h-2.5 h in a non-oxidizing atmosphere to obtain the anode material; wherein a mass ratio of the carbon-coated silicon monoxide to the reducing lithium-containing compound is 10:(0.08-1.2).

In a third aspect, the present application provides a lithium ion battery including the anode material according to the first aspect or the anode material prepared by the preparation method according to the second aspect.

With respect to the prior art, the present application has the following beneficial effects:

(1) the preparation method provided by the present application can make the final pre-lithiated product only has $Li_2Si_2O_5$ in a low-temperature crystalline phase but no $Li_2SiO_3$ in a high-temperature crystalline phase by adding the nucleating conversion agent or the heat absorbent, thus fundamentally solving the processing problem of the pre-lithiated material and simplifying the preparation process of the pre-lithiated material, that is, no additional surface treatment of the pre-lithiated material is needed, which prevents the problems such as gas production. In addition, $Li_2SiO_3$ in a high temperature crystalline phase can be directly transformed into $Li_2Si_2O_5$ in a low temperature crystalline phase by adding the nucleating conversion agent or the heat absorbent, which can avoid the problems such as capacity reduction and initial efficiency reduction of the anode material due to surface treatment.

(2) The anode material provided by the present application has the advantages of a stable processability, a high initial efficiency and a long cycle life.

BRIEF DESCRIPTION OF DRAWINGS

FIG. 5*a* is a gas production test photograph of the anode material prepared in Comparative example 2;

DESCRIPTION OF EMBODIMENTS

Figure 1:
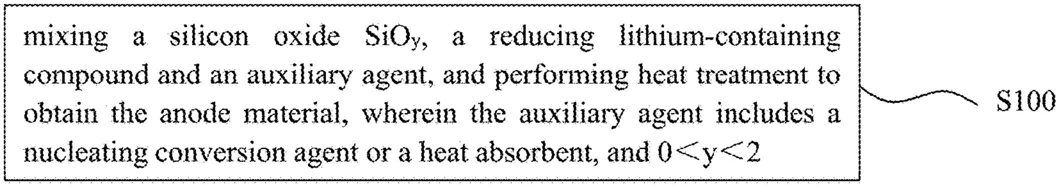
FIG. 1 is a process flow chart of a preparation method of an anode material provided by the present application.

In order to better explain the present application and facilitate understanding of the technical solution of the present application, the present application is further described in detail below. However, the following examples are only simple examples of the present application, and do not represent or limit the scope of protection of the present application, which shall be defined by the claims.

The follow are typical but non-limiting examples of the present application:

Most silicon-based/silica-based materials will produce a certain amount of irreversible phases (such as $Li_4SiO_4$, $Li_2O$, etc.) during the initial lithium intercalation, which leads to the low initial coulombic efficiency of the battery. Lithium is doped into the anode material by pre-lithiation. Therefore, in the formation process of the battery, a SEI film formed at the interface of the anode will consume lithium in the anode material, instead of lithium ions deintercalated from the cathode, thereby maximally retaining the lithium ions deintercalated from the cathode and improving the capacity of the whole battery. At present, there are a large number of phases of $Li_2SiO_3$, $Li_4SiO_4$, even $Li_2O$ and $Li_xSi$ in the pre-lithiated material, which will consume the electrolyte and Li removed from the cathode, and this process is irreversible, resulting in serious loss of the initial reversible capacity. Moreover, these components are easily soluble in water, showing strong alkalinity, resulting in poor processability.

In a first aspect, an embodiment of the present application provides an anode material including $SiO_x$ and $Li_2Si_2O_5$, wherein $SiO_x$ is dispersed in $Li_2Si_2O_5$, and wherein $0 \le x \le 1.2$.

The anode material provided in the present application only contains one lithium silicate phase, i.e. $Li_2Si_2O_5$. Since $Li_2Si_2O_5$ is insoluble in water, it can fundamentally solve the processing stability problems of the anode material after pre-lithiation treatment, such as gas production of slurry, low viscosity, tailing during coating, pinholes and pores after drying the polar plate, etc. No additional surface treatment is needed for the pre-lithiated material, which can avoid the problems of capacity reduction and initial efficiency reduction of lithium batteries due to surface treatment. As an optional technical solution of the present application, the $SiO_x$ is uniformly dispersed in $Li_2Si_2O_5$, for example, watermelon seeds ($SiO_x$) are dispersed in watermelon capsules ($Li_2Si_2O_5$).

As an optional technical solution of the present application, in $SiO_x$, $0 \le x \le 1.2$, and $SiO_x$ can be, for example, Si, $SiO_{0.2}$, $SiO_{0.4}$, $SiO_{0.6}$, $SiO_{0.8}$, SiO or $SiO_{1.2}$, etc. Preferably, $SiO_x$ is SiO. Understandably, the composition of $SiO_x$ is relatively complex, which can be understood as being formed by uniformly dispersing nano-silicon in $SiO_2$.

As an optional technical solution of the present application, the average particle size of the anode material is 5 μm-50 μm; more specifically, it can be, but not limited to, 5 μm, 10 μm, 15 μm, 20 μm, 25 μm, 30 μm, 35 μm, 40 μm or 50 μm, etc., and other unlisted values within the numerical range are also applicable. The average particle size of the silicon composite anode material is controlled within the above range, which is beneficial to improve the cycle performance of the anode material.

As an optional technical solution of the present application, the mass ratio of $SiO_x$ to $Li_2Si_2O_5$ in the anode material is 1:(0.74-6.6); more specifically, it can be, but not limited to, 1:0.74, 1:1.4, 1:1.6, 1:2.0, 1:2.3, 1:2.9, 1:3.5, 1:4, 1:5.0, 1:6.1 or 1:6.6, etc., and other unlisted values within the numerical range are also applicable. When the mass ratio of $SiO_x$ to $Li_2Si_2O_5$ is too less, the content of $Li_2Si_2O_5$ in the material is too less, and the slurry made of the anode material is easy to produce gas, and pinholes and bubbles are easy to appear after drying the polar plate, which is not conducive to improving the processability of the anode material. When the mass ratio of $SiO_x$ to $Li_2Si_2O_5$ is too large, the content of $Li_2Si_2O_5$ in the material is too large, and the lithium ion transmission efficiency decreases, which is not conducive to the high-rate charge and discharge of the material.

In a specific embodiment, the anode material only contains $Li_2Si_2O_5$.

As an optional technical solution of the present application, the pH value of the anode material meets 7<pH<10.7, and for example, the pH value can be 7.1, 8.0, 9.3, 9.8, 9.9, 10.0, 10.1, 10.2, 10.3, 10.4, 10.5 or 10.6, etc. Understandably, the material can be kept at a low alkalinity, the water-based processability of the material can be improved, and the initial efficiency of the anode material can be improved.

As an optional technical solution of the present application, the surface of the anode material is coated with a carbon layer.

Optionally, the thickness of the carbon layer is 10 nm to 2000 nm; specifically, it can be, but not limited to, 10 nm, 50 nm, 100 nm, 300 nm, 500 nm, 800 nm, 1000 nm, 1500 nm, 1800 nm or 2000 nm, and other unlisted values within the numerical range are also applicable. Too thick a carbon layer reduces lithium ion transmission efficiency, which is not conducive to high-rate charge and discharge of the material and reduces the comprehensive performance of the anode material. Too thin a carbon layer is not conducive to increasing the conductivity of the anode material, and has weak inhibition performance on volume expansion of the material, resulting in a poor long cycle performance.

Preferably, when the surface of the anode material is coated with a carbon layer, the mass fraction of the carbon element in the anode material is 4%-6%, more specifically, it can be, but not limited to, 4%, 4.5%, 5%, 5.5% or 6%, etc., and other unlisted values within the numerical range are also applicable.

In a second aspect, the present application provides a preparation method of the anode material, as shown in FIG. 1, which includes the following steps:

S100, mixing a silicon oxide $SiO_y$, a reducing lithium-containing compound and an auxiliary agent, and performing heat treatment to obtain the anode material, wherein the auxiliary agent includes a nucleating conversion agent or a heat absorbent, and 0<y<2.

The preparation method provided by the present application can make only one lithium silicate phase, i.e. $Li_2Si_2O_5$ is generated after the silicon oxide reacts with the reducing lithium-containing compound (i.e., pre-lithiation) by using the nucleating conversion agent or the heat absorbent. Since $Li_2Si_2O_5$ is insoluble in water, the processing stability problems of the pre-lithiated material, such as gas production of slurry, low viscosity, tailing during coating, pinholes and pores after drying the polar plate, etc., are solved.

It should be noted that the nucleating conversion agent can be used to accelerate the crystallization rate, increase the crystallization density and promote the grain size refinement. In the preparation process, the silicon oxide $SiO_y$ and the reducing lithium-containing compound can generate $Li_2SiO_3$ and $Li_2Si_2O_5$, and the added nucleating conversion agent can accelerate the crystallization rate and promote the generated $Li_2SiO_3$ in a high temperature crystalline phase to be transformed into $Li_2Si_2O_5$ in a low temperature crystalline phase, thus avoiding the problems of capacity reduction and initial efficiency reduction due to surface treatment.

It should be noted that the heat absorbent can be used to lower the reaction temperature. In the preparation process, the silicon oxide $SiO_y$ and reducing lithium-containing compound can generate $Li_2SiO_3$ and $Li_2Si_2O_5$, and the added heat absorbent can reduce the reaction temperature. With the reduction of the reaction temperature, it is beneficial to promote the phase shift of the generated lithium silicate crystals to $Li_2Si_2O_5$ phase which is a low-temperature crystalline phase, that is, to promote the generated $Li_2SiO_3$ in a high-temperature crystalline phase to be transformed into $Li_2Si_2O_5$ in a low-temperature crystalline phase, thus avoiding the problems of capacity reduction and initial efficiency reduction due to surface treatment.

The following is the preferred technical solutions of the present application, but not the limitation of the technical solution provided by the present application. The technical purpose and beneficial effects of the present application can be better achieved and realized through the following preferred technical solutions.

As an optional technical solution of the present application, in the silicon oxide $SiO_y$, 0<y<2, for example, $SiO_y$ is $SiO_{0.2}$, $SiO_{0.5}$, $SiO_{0.8}$, SiO, $SiO_{1.2}$, $SiO_{1.5}$ or $SiO_{1.9}$, etc. Preferably, the silicon oxide is SiO, and when the silicon oxide is SiO, it can effectively solve the problem of unstable processing performance of SiO, after improving the initial efficiency by being doped with lithium.

Preferably, the particle size D10 of the silicon oxide particles meets the particle size D10>1.0 μm and Dmax<50 μm. For example, D10 is 1.0 μm 1.5 μm 2.0 μm, 2.5 μm, 3.0 μm, 4.0 μm or 5.0 μm, and Dmax is 49 μm 45 μm, 30 μm, 35 μm or 20 μm Here, Dmax refers to the particle size of the largest particle.

As an optional technical solution of the present application, the reducing lithium-containing compound includes at least one of lithium hydride, alkyl lithium, metallic lithium, lithium aluminum hydride, lithium amide and lithium borohydride.

As an optional technical solution of the present application, the nucleation conversion agent comprises at least one of phosphorus oxide and phosphate. Optionally, the phosphorus oxide includes at least one of phosphorus pentoxide and phosphorus trioxide.

As an optional technical solution of the present application, the phosphate includes at least one of lithium phosphate, magnesium phosphate and sodium phosphate.

Preferably, the nucleation conversion agent is phosphorus pentoxide. In the present application, it is particularly preferred to use phosphorus pentoxide as the nucleating conversion agent, which has the advantages that the effect of transforming $Li_2SiO_3$ into $Li_2Si_2O_5$ is more significant, and the amount of nucleating conversion agent can be reduced, so as to reduce the production cost on the one hand and the production difficulty on the other hand.

As an optional technical solution of the present application, the melting point of the heat absorbent is less than 700° C.; the heat absorbent includes at least one of LiCl, NaCl, $NaNO_3$, $KNO_3$, KOH, BaCl, KCl and LiF.

Preferably, the heat absorbent is $KNO_3$. In the present application, $KNO_3$ is particularly preferred as a heat absorbent, which has the advantages that, firstly, the use temperature of $KNO_3$ is low, and the promotion effect on the formation of $Li_2Si_2O_5$ is more significant; secondly, $KNO_3$ is low in cost, easily available as a raw material, non-toxic and harmless, and environmentally friendly.

As an optional technical solution of the present application, the mass ratio of the silicon oxide to the reducing lithium-containing compound is 10:(0.08-1.2), for example but not limited to, 10:0.08, 10:0.2, 10:0.5, 10:0.8 or 10:1.2, etc., and other unlisted values within the numerical range are also applicable. The mass ratio within the above range is beneficial to improve the conversion rate of $Li_2SiO_3$ into $Li_2Si_2O_5$.

As an optional technical solution of the present application, the mass ratio of the silicon oxide to the nucleating conversion agent is 100:(2-10), for example but not limited to, 100:2, 100:2.5 or 100:3, 100:5, 100:7, 100:10, etc., and other unlisted values within the numerical range are also applicable. Understandably, if the amount of the nucleating conversion agent is too large, the crystal grain of $Li_2Si_2O_5$ will be too large, which will affect the cycle performance. If the amount of the nucleating conversion agent is too less, it will lead to residual $Li_2SiO_3$, which will affect the processing stability of the water-based slurry of the material.

As an optional technical solution of the present application, the mass ratio of the silicon oxide to the heat absorbent is 100:(8-30), for example but not limited to, 100:8, 100:10, 100:15, 100:20, 100:25 or 100:30, etc., and other unlisted values within the numerical range are also applicable.

As an optional technical solution of the present application, the specific step of mixing the silicon oxide, the reducing lithium-containing compound and the nucleating conversion agent includes: mixing the silicon oxide and the nucleating conversion agent, and then adding the reducing lithium-containing compound.

Understandably, after mixing silicon oxide and the nucleating conversion agent, the nucleating conversion agent adheres to the surface of silicon oxide. When the reducing lithium-containing compound reacts with the silicon oxide, the nucleating conversion agent adhered to the surface of silicon oxide can timely transform part of $Li_2SiO_3$ in a high-temperature crystalline phase generated by the reaction into $Li_2Si_2O_5$ in a low-temperature crystalline phase, that is, as the reaction progresses, the phase transformation of lithium silicate also proceeds at the same time, and the nucleating conversion agent promotes the shift of the crystals of lithium silicate to $Li_2Si_2O_5$ in a low-temperature crystalline phase and transforms the crystal structure of lithium silicate.

Optionally, the heat treatment is carried out in a non-oxidizing atmosphere, and the non-oxidizing atmosphere includes at least one of hydrogen, nitrogen, helium, neon, argon, krypton or xenon.

In some specific embodiments, the heat treatment may be performed in a firing furnace, so that the heat treatment is sufficiently performed.

Optionally, the temperature of the heat treatment is 300° C.-1000° C., for example but not limited to, 300° C., 400° C., 450° C., 480° C., 500° C., 600° C., 700° C., 800° C., 900° C. or 1000° C., etc., and other unlisted values within the numerical range are also applicable. Understandably, when the heat treatment temperature is too high, it will lead to severe reaction, rapid growth of silicon grains, disproportionation of SiO, and deterioration of properties, which will affect the cycle performance of the material. When the heat treatment temperature is too low, the reaction is difficult to proceed, resulting in the inability to form $Li_2Si_2O_5$. Preferably, the temperature of the heat treatment is 450° C.-800° C.

Preferably, the time of the heat treatment is 1.5 h-2.5 h, for example but not limited to, 1.5 h, 1.7 h, 2 h, 2.3 h or 2.5 h, and other unlisted values within the numerical range are also applicable. Understandably, full calcination can fully transform $Li_2SiO_3$ into $Li_2Si_2O_5$.

Further, before the step S100, the method further includes:

heating and gasifying a raw material of the silicon oxide to generate a silicon oxide gas, condensing and shaping to obtain the silicon oxide $SiO_y$, wherein $0<y<2$.

As an optional technical solution of the present application, the raw material of the silicon oxide includes Si and $SiO_2$. And the specific ratio of Si and $SiO_2$ can be adjusted according to the required y value of $SiO_y$, and is not limited here.

As an optional technical solution in the present application, the mass ratio of silicon to silicon dioxide is 1:(1.8-2.2), for example but not limited to 1:1.8, 1:1.9, 1:2.0, 1:2.1 or 1:2.2, etc., and other unlisted values within this numerical range are also applicable.

The temperature of the heating is 1200° C.-1400° C., for example but not limited to 1200° C., 1250° C., 1300° C., 1350° C. or 1400° C., etc., and other unlisted values within the numerical range are also applicable.

Optionally, the time of the heating gasification is 16 h-20 h, for example but not limited to, 16 h, 17 h, 18 h, 19 h or 20 h, etc., and other unlisted values within the numerical range are also applicable.

Optionally, the temperature of the condensation is 930° C.-970° C., for example but not limited to 930° C., 940° C., 950° C., 960° C. or 970° C., etc., and other unlisted values within the numerical range are also applicable.

Optionally, the shaping includes at least one of crushing, ball milling or grading.

As an optional technical solution in the present application, silicon oxide $SiO_y$ particles meets D10>1.0 μm and Dmax<50 μm for example, D10 is 1.1 μm 1.5 μm 2.0 μm, 2.5 μm 3.0 μm 4.0 μm or 5.0 μm and Dmax is 49 μm 45 μm, 30 μm, 35 μm or 20 μm. It should be noted that Dmax refers to the particle size of the largest particle.

Preferably, the heating gasification is carried out in a protective atmosphere or vacuum. In the present application, the protective atmosphere can be selected according to the prior art, such as nitrogen atmosphere and/or argon atmosphere. The vacuum degree of the vacuum can be selected according to the prior art, for example, 5 Pa.

Furthermore, the method further includes:

Performing carbon coating on a material to be coated with carbon, wherein the material to be coated with carbon includes at least one of the silicon oxide and the anode material; the carbon coating includes at least one of gas-phase carbon coating and solid-phase carbon coating.

As an optional technical solution of the present application, when the gas-phase carbon coating is adopted, the silicon oxide is heated to 600° C.-1000° C., such as 600° C., 700° C., 800° C., 900° C. or 1000° C., etc., in a protective atmosphere, and an organic carbon source gas is introduced, keeping the temperature for 0.5 h-10 h, such as for 0.5 h, 1 h, 2 h, 5 h, 8 h or 10 h, etc., and then cooled. In the present application, the protective atmosphere can be selected according to the prior art, such as nitrogen atmosphere and/or argon atmosphere.

Preferably, the organic carbon source gas includes hydrocarbons. The hydrocarbons include at least one of methane, ethylene, acetylene and benzene.

As an optional technical solution of the present application, when the solid-phase carbon coating is adopted, the silicon oxide and a carbon source are blended for 0.5 h or more, and then the obtained carbon mixture is carbonized at 600° C.-1000° C. for 2 h-6 h, and cooled. The blending time is 0.5 h or more, such as 0.5 h, 0.6 h, 0.7 h, 0.8 h, 1 h, 1.5 h or 2 h, the carbonization temperature can be 600° C., 700° C., 800° C., 900° C. or 1000° C., and the carbonization time can be, for example, 2 h, 3 h, 4 h, 5 h or 6 h.

Understandably, the silicon oxide is coated with carbon firstly and then subjected to a lithiation reaction, which can effectively simplify the preparation process and reduce the cost. In addition, a carbon layer is formed on the surface of the silicon oxide, and the carbon layer is relatively loose and has a large number of micropores, so that subsequent the reducing lithium-containing compound can pass through the micropores of the carbon layer, permeate through the carbon layer and react on the surface of the silicon oxide, which can appropriately inhibit the severity of the reaction, so that a uniform $Li_2Si_2O_5$ layer is formed on the surface of the silicon oxide, and the electrochemical performance of the material is improved.

Optionally, the blending is performed in a blender, and the rotational speed of the blender is 500 r/min-3000 r/min, such as 500 r/min, 1000 r/min, 1500 r/min, 2000 r/min, 2500 r/min or 3000 r/min. The width of the blade gap of the blender can be selected according to the prior art, for example, 0.5 cm.

In some embodiments, the carbon source includes at least one of polymer, saccharide, organic acid and asphalt.

In the present application, the operation conditions such as the carbonization temperature, time and blending are mutually coordinating, which is beneficial to the formation of a carbon layer on the surface of the silicon oxide. The carbon layer is relatively loose and has a large number of micropores, so that subsequent the reducing lithium-containing compounds can pass through the micropores of the carbon layer and permeate through the carbon layer to react on the surface of silicon oxide. Therefore, the carbon layer is still located at the outermost layer in the obtained anode material, which can better improve the performance of the product.

Furthermore, as a further preferred technical solution of the preparation method described in the present application, the method includes the following steps:

- heating and gasifying silicon and silicon dioxide in a mass ratio of 1:(1.8-2.2) at 1200° C.-1400° C. in vacuum for 16 h-20 h, condensing at 930° C.-970° C., and shaping to obtain silicon monoxide;
- performing carbon coating on the silicon monoxide to obtain carbon-coated silicon monoxide; and
- mixing the carbon-coated silicon oxide and phosphorus pentoxide according to a mass ratio of 100:(2-10), adding a reducing lithium-containing compound and mixing, and roasting at 450° C.-800° C. for 1.5 h-2.5 h in a non-oxidizing atmosphere to obtain an anode material; wherein the mass ratio of the carbon-coated silicon monoxide to the reducing lithium-containing compound is 10:(0.08-1.2).

In a third aspect, the present application provides a lithium ion battery, including the silicon-oxygen composite anode material described in the first aspect or the silicon-oxygen composite anode material prepared by the preparation method described in the second aspect.

The following examples are divided into several examples to further explain the embodiments of the present application. The embodiments of the present application are not limited to the following specific embodiments. Within the scope of protection, modifications can be properly implemented.

Example 1

In this example, the anode material was prepared as follows:

(1) 1 kg of Si powder and 2 kg of $SiO_2$ powder were fed into a VC mixer and mixed for 30 min to obtain a mixture of $SiO_2$ and Si; the mixture was put into a vacuum furnace, heated to 1300° C. while keeping the temperature for 18 h under the negative pressure of 5 Pa; the SiO steam generated in the furnace was rapidly condensed (the condensation temperature was 950° C.) to form a SiO block; after treatment such as crushing, ball milling and grading of the SiO block, a SiO powder material were obtained, wherein the median particle size was controlled at about 6 μm (D10 was 1.2 μm Dmax was 28 μm).

(2) 1 kg of the SiO powder material and 20 g of phosphorus pentoxide were fed into a VC mixer, mixed for 40 min, and then taken out to obtain a mixture of SiO and phosphorus pentoxide; then the mixture was put into a ball mill tank, 100 g of lithium hydride was added for ball milling for 20 min, and then taken out to obtain a pre-lithiated precursor; the pre-lithiated precursor was subjected to heat treatment under nitrogen protection at 800° C. for 2 h, and then naturally cooled to room temperature; taken out, sieved and demagnetized to obtain an anode material.

The anode material prepared in this example included $SiO_{0.8}$ and $Li_2Si_2O_5$, and the $SiO_{0.8}$ was uniformly dispersed in $Li_2Si_2O_5$. In the anode material, the mass ratio of $SiO_{0.8}$ to $Li_2Si_2O_5$ was 1:2.6. The pH value of the anode material was 10.5.

The conventional performance test results of the anode material prepared in this example are shown in Table 1 and the electrochemical performance test results are shown in Table 2.

Example 2

In this example, the anode material was prepared as follows:

(1) 1 kg of Si powder and 2 kg of $SiO_2$ powder were fed into a VC mixer and mixed for 30 min to obtain a mixture of $SiO_2$ and Si; the mixture was put into a vacuum furnace, heated to 1300° C. while keeping the temperature for 18 h under the negative pressure of 5 Pa; the SiO steam generated in the furnace was rapidly condensed (the condensation temperature was 950° C.) to form a SiO block; after treatment such as crushing, ball milling and grading of the SiO block, a SiO powder material were obtained, wherein the median particle size was controlled at about 6 μm (D10 was 1.3 μm Dmax was 25 μm).

(2) 1.5 kg of the SiO powder material was placed in CVD rotary furnace, acetylene was introduced as a carbon source, nitrogen was introduced as protective gas. A deposition process was conducted at 800° C. for 70 min, then cooled and output to obtain a SiO/C material.

(3) 1 kg of the SiO/C material and 20 g of phosphorus pentoxide were fed into a VC mixer, mixed for 40 min, and then taken out to obtain a mixture of SiO/C and phosphorus pentoxide; then the mixture was put into a ball mill tank, 100 g of lithium hydride was added for ball milling for 20 min, and then taken out to obtain a pre-lithiated precursor; the pre-lithiated precursor was subjected to heat treatment under nitrogen protection at 800° C. for 2 h, and then naturally cooled to room temperature, taken out, sieved and demagnetized to obtain an anode material.

The anode material prepared in this example included $SiO_{0.8}$ and $Li_2Si_2O_5$, and the $SiO_{0.8}$ was uniformly dispersed in $Li_2Si_2O_5$. In the anode material, the mass ratio of $SiO_{0.8}$ to $Li_2Si_2O_5$ was 1:2.1. The pH value of the anode material was 10.2. The surface of the anode material was coated with a carbon layer with a thickness of 205 nm.

Figure 2:
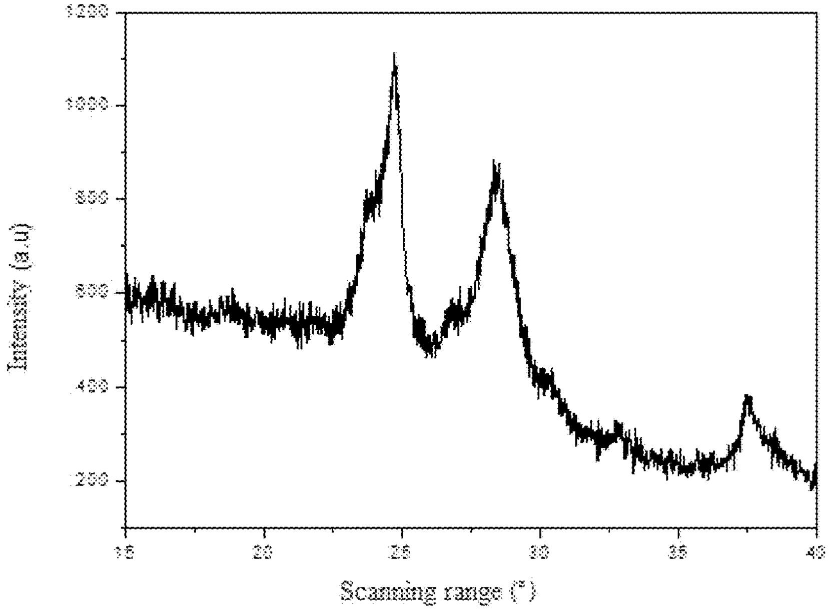
FIG. 2 is an XRD pattern of the anode material prepared in Example 2 of the present application.

FIG. 2 is a XRD pattern of the anode material prepared in this example, from which it can be seen that there are only the characteristic peaks of the substances $Li_2Si_2O_5$ and silicon.

Figure 3A:
FIG. 3*a* is a gas production test photograph of the anode material prepared in Example 2 of the present application.

FIG. 3*a* is a gas production test photograph of the anode material prepared in this example, from which it can be seen from this photograph that the aluminum-plastic film bag has no bulge or protrusion and the surface is flat, indicating that the material does not produce gas.

Figure 3B:
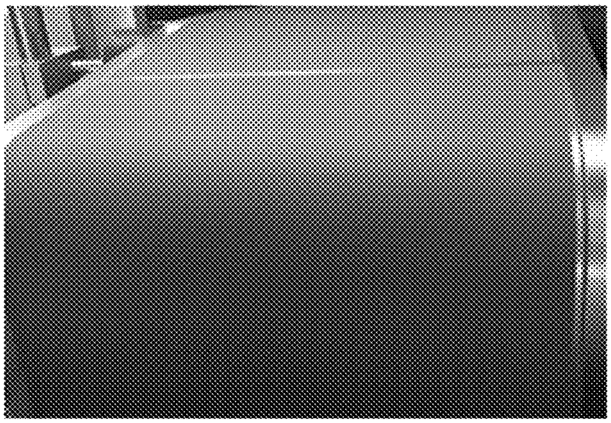
FIG. 3*b* is a coating test photograph of the anode material prepared in Example 2 of the present application.

FIG. 3*b* is a coating test photograph of the anode material prepared in this example, from which it can be seen that the polar plate is smooth and flat.

The conventional performance test results of the anode material prepared in this example are shown in Table 1 and the electrochemical performance test results are shown in Table 2.

Example 3

(1) 1 kg of Si powder and 2 kg of $SiO_2$ powder were fed into a VC mixer and mixed for 30 min to obtain a mixture of $SiO_2$ and Si; the mixture was put into a vacuum furnace, heated to 1300° C. while keeping the temperature for 18 h under the negative pressure of 5 Pa; the SiO steam generated in the furnace was rapidly condensed (the condensation temperature was 950° C.) to form a SiO block; after treatment such as crushing, ball milling and grading of the SiO block, a SiO powder material were obtained, wherein the median particle size was controlled at about 6 μm (D10 was 1.3 μm Dmax was 25 μm).

(2) 1.5 kg of the SiO powder material was placed in CVD rotary furnace, acetylene was introduced as a carbon source, nitrogen was introduced as protective gas. A deposition process was conducted at 800° C. for 70 min, then cooled and output to obtain a SiO/C material.

(3) 1 kg of the SiO/C material and 30 g of phosphorus pentoxide were fed into a VC mixer, mixed for 40 min, and then taken out to obtain a mixture of SiO/C and phosphorus pentoxide; then the mixture was put into a ball mill tank, 120 g of lithium hydride was added for ball milling for 20 min, and then taken out to obtain a pre-lithiated precursor; the pre-lithiated precursor was subjected to heat treatment under nitrogen protection at 800° C. for 2 h, and then naturally cooled to room temperature, taken out, sieved and demagnetized to obtain an anode material.

The anode material prepared in this example included $SiO_{0.8}$ and $Li_2Si_2O_5$, and the $SiO_{0.5}$ was uniformly dispersed in $Li_2Si_2O_5$. In the anode material, the mass ratio of $SiO_{0.5}$ to $Li_2Si_2O_5$ was 1:1.4. The pH value of the anode material was 10.3. The surface of the anode material was coated with a carbon layer with a thickness of 200 nm.

The conventional performance test results of the anode material prepared in this example are shown in Table 1 and the electrochemical performance test results are shown in Table 2.

Example 4

In this example, the anode material was prepared as follows:

(1) 1 kg of Si powder and 2 kg of $SiO_2$ powder were fed into a VC mixer and mixed for 30 min to obtain a mixture of $SiO_2$ and Si; the mixture was put into a vacuum furnace, heated to 1300° C. while keeping the temperature for 18 h under the negative pressure of 5 Pa; the SiO steam generated in the furnace was rapidly condensed (the condensation temperature was 950° C.) to form a SiO block; after treatment such as crushing, ball milling and grading of the SiO block, a SiO powder material were obtained, wherein the median particle size was controlled at about 6 μm (D10 was 1.5 μm Dmax was 29 μm).

(2) 1.5 kg of the SiO powder material and 113 g of asphalt were placed in a VC mixer and mixed for 30 min with a rotating speed of 800 rpm, output and then placed in a high-temperature box furnace which was introduced nitrogen for protection, fired at 900° C. for 3 h, naturally cooled to room temperature and output to obtain a SiO/C material.

(3) 1 kg of the SiO/C material and 20 g of phosphorus pentoxide were fed into a VC mixer, mixed for 40 min, and then taken out to obtain a mixture of SiO/C and phosphorus pentoxide; then the mixture was put into a ball mill tank, 100 g of lithium hydride was added for ball milling for 20 min, and then taken out to obtain a pre-lithiated precursor; the pre-lithiated precursor was subjected to heat treatment under nitrogen protection at 800° C. for 2 h, and then naturally cooled to room temperature, taken out, sieved and demagnetized to obtain an anode material.

The anode material prepared in this example included $SiO_{0.86}$ and $Li_2Si_2O_5$, and the $SiO_{0.86}$ was uniformly dispersed in $Li_2Si_2O_5$. In the anode material, the mass ratio of $SiO_{0.86}$ to $Li_2Si_2O_5$ was 1:2.2. The pH value of the anode material was 10.0. The surface of the anode material was coated with a carbon layer with a thickness of 220 nm.

The conventional performance test results of the anode material prepared in this example are shown in Table 1 and the electrochemical performance test results are shown in Table 2.

Example 5

In this example, the anode material was prepared as follows:

(1) 1 kg of Si powder and 1.8 kg of $SiO_2$ powder were fed into a VC mixer and mixed for 30 min to obtain a mixture of $SiO_2$ and Si; the mixture was put into a vacuum furnace, heated to 1200° C. while keeping the temperature for 20 h under the negative pressure of 5 Pa; the SiO steam generated in the furnace was rapidly condensed (the condensation temperature was 930° C.) to form a $SiO_{0.92}$ block; after treatment such as crushing, ball milling and grading of the $SiO_{0.92}$ block, a $SiO_{0.92}$ powder material were obtained, wherein the median particle size was controlled at about 6 μm (D10 was 1.5 μm Dmax was 26 μm).

(2) 1.5 kg of the $SiO_{0.92}$ powder material was placed in CVD rotary furnace, methane was introduced as a carbon source, nitrogen was introduced as protective gas. A deposition process was conducted at 600° C. for 1 h, then cooled and output to obtain a $SiO_{0.92}$/C material.

(3) 1 kg of the $SiO_{0.92}$/C material and 70 g of phosphorus pentoxide were fed into a VC mixer, mixed for 40 min, and then taken out to obtain a mixture of $SiO_{0.92}$/C and phosphorus pentoxide; then the mixture was put into a ball mill tank, 100 g of lithium hydride was added for ball milling for 20 min, and then taken out to obtain a pre-lithiated precursor; the pre-lithiated precursor was subjected to heat treatment under nitrogen protection at 600° C. for 2 h, and then naturally cooled to room temperature, taken out, sieved and demagnetized to obtain an anode material.

The anode material prepared in this example included $SiO_{0.7}$ and $Li_2Si_2O_5$, and the $SiO_{0.7}$ was uniformly dispersed in $Li_2Si_2O_5$. In the anode material, the mass ratio of $SiO_{0.7}$ to $Li_2Si_2O_5$ was 1:2.0. The pH value of the anode material was 10.6. The surface of the anode material was coated with a carbon layer with a thickness of 199 nm.

The conventional performance test results of the anode material prepared in this example are shown in Table 1 and the electrochemical performance test results are shown in Table 2.

Example 6

In this example, the anode material was prepared as follows:

(1) 1 kg of Si powder and 2.2 kg of $SiO_2$ powder were fed into a VC mixer and mixed for 30 min to obtain a mixture of $SiO_2$ and Si; the mixture was put into a vacuum furnace, heated to 1400° C. while keeping the temperature for 16 h under the negative pressure of 5 Pa; the SiO steam generated in the furnace was rapidly condensed (the condensation temperature was 970° C.) to form a $SiO_{1.3}$ block; after treatment such as crushing, ball milling and grading of the $SiO_{1.3}$ block, a $SiO_{1.3}$ powder material were obtained, wherein the median particle size was controlled at about 6 μm (D10 was 1.6 μm Dmax was 25 μm).

(2) 1.5 kg of the $SiO_{1.3}$ powder material was placed in CVD rotary furnace, ethylene was introduced as a carbon source, nitrogen was introduced as protective gas. A deposition process was conducted at 1000° C. for 30 min, then cooled and output to obtain a $SiO_{1.3}$/C material.

(3) 1 kg of the $SiO_{1.3}$/C material and 100 g of phosphorus pentoxide were fed into a VC mixer, mixed for 40 min, and then taken out to obtain a mixture of $SiO_{1.3}$/C and phosphorus pentoxide; then the mixture was put into a ball mill tank, 100 g of lithium hydride was added for ball milling for 20 min, and then taken out to obtain a pre-lithiated precursor; the pre-lithiated precursor was subjected to heat treatment under nitrogen protection at 450° C. for 2 h, and then naturally cooled to room temperature, taken out, sieved and demagnetized to obtain an anode material.

The anode material prepared in this example included $SiO_{1.2}$ and $Li_2Si_2O_5$, and the $SiO_{1.2}$ was uniformly dispersed in $Li_2Si_2O_5$. In the anode material, the mass ratio of $SiO_{1.2}$ to $Li_2Si_2O_5$ was 1:2.1. The pH value of the anode material was 9.8. The surface of the anode material was coated with a carbon layer with a thickness of 204 nm.

The conventional performance test results of the anode material prepared in this example are shown in Table 1 and the electrochemical performance test results are shown in Table 2.

Example 7

In this example, the anode material was prepared as follows:

(1) 1 kg of Si powder and 2 kg of $SiO_2$ powder were fed into a VC mixer and mixed for 30 min to obtain a mixture of $SiO_2$ and Si; the mixture was put into a vacuum furnace, heated to 1300° C. while keeping the temperature for 18 h under the negative pressure of 5 Pa; the SiO steam generated in the furnace was rapidly condensed (the condensation temperature was 950° C.) to form a SiO block; after treatment such as crushing, ball milling and grading of the SiO block, a SiO powder material were obtained, wherein the median particle size was controlled at about 6 μm (D10 was 1.1 μm Dmax was 27 μm).

(2) 1.5 kg of the SiO powder material and 113 g of asphalt were placed in a VC mixer and mixed for 40 min with a rotating speed of 500 rpm, output and then placed in a high-temperature box furnace which was introduced nitrogen for protection, fired at 600° C. for 6 h, naturally cooled to room temperature and output to obtain a SiO/C material.

(3) 1 kg of the SiO/C material and 20 g of phosphorus pentoxide were fed into a VC mixer, mixed for 40 min, and then taken out to obtain a mixture of SiO/C and phosphorus pentoxide; then the mixture was put into a ball mill tank, 120 g of lithium borohydride was added for ball milling for 20 min, and then taken out to obtain a pre-lithiated precursor; the pre-lithiated precursor was subjected to heat treatment under nitrogen protection at 300° C. for 2.5 h, and then naturally cooled to room temperature, taken out, sieved and demagnetized to obtain an anode material.

The anode material prepared in this example included $SiO_{0.6}$ and $Li_2Si_2O_5$, and the $SiO_{0.6}$ was uniformly dispersed in $Li_2Si_2O_5$. In the anode material, the mass ratio of $SiO_{0.6}$ to $Li_2Si_2O_5$ was 1:3.0. The pH value of the anode material was 10.2. The surface of the anode material was coated with a carbon layer with a thickness of 210 nm.

The conventional performance test results of the anode material prepared in this example are shown in Table 1 and the electrochemical performance test results are shown in Table 2.

Example 8

In this example, the anode material was prepared as follows:

(1) 1 kg of Si powder and 2 kg of $SiO_2$ powder were fed into a VC mixer and mixed for 30 min to obtain a mixture of $SiO_2$ and Si; the mixture was put into a vacuum furnace, heated to 1300° C. while keeping the temperature for 18 h under the negative pressure of 5 Pa; the SiO steam generated in the furnace was rapidly condensed (the condensation temperature was 950° C.) to form a SiO block; after treatment such as crushing, ball milling and grading of the SiO block, a SiO powder material were obtained, wherein the median particle size was controlled at about 6 μm (D10 was 1.5 μm Dmax was 26 μm).

(2) 1.5 kg of the SiO powder material and 113 g of asphalt were placed in a VC mixer and mixed for 50 min with a rotating speed of 3000 rpm, output and then placed in a high-temperature box furnace which was introduced nitrogen for protection, fired at 1000° C. for 2 h, naturally cooled to room temperature and output to obtain a SiO/C material.

(3) 1 kg of the SiO/C material and 20 g of phosphorus pentoxide were fed into a VC mixer, mixed for 40 min, and then taken out to obtain a mixture of SiO/C and phosphorus pentoxide; then the mixture was put into a ball mill tank, 150 g of metallic lithium was added for ball milling for 20 min, and then taken out to obtain a pre-lithiated precursor; the pre-lithiated precursor was subjected to heat treatment under nitrogen protection at 1000° C. for 1.5 h, and then naturally cooled to room temperature, taken out, sieved and demagnetized to obtain an anode material.

The anode material prepared in this example included $SiO_{0.2}$ and $Li_2Si_2O_5$, and the $SiO_{0.2}$ was uniformly dispersed in $Li_2Si_2O_5$. In the anode material, the mass ratio of $SiO_{0.2}$ to $Li_2Si_2O_5$ was 1:1.6. The pH value of the anode material was 10.6. The surface of the anode material was coated with a carbon layer with a thickness of 198 nm.

The conventional performance test results of the anode material prepared in this example are shown in Table 1 and the electrochemical performance test results are shown in Table 2.

Example 9

In this example, the anode material was prepared as follows:

(1) 1 kg of Si powder and 2 kg of $SiO_2$ powder were fed into a VC mixer and mixed for 30 min to obtain a mixture of $SiO_2$ and Si; the mixture was put into a vacuum furnace, heated to 1300° C. while keeping the temperature for 18 h under the negative pressure of 5 Pa; the SiO steam generated in the furnace was rapidly condensed (the condensation temperature was 950° C.) to form a SiO block; after treatment such as crushing, ball milling and grading of the SiO block, a SiO powder material were obtained, wherein the median particle size was controlled at about 6 μm (D10 was 1.5 μm Dmax was 29 μm).

(2) 1.5 kg of the SiO powder material and 113 g of asphalt were placed in a VC mixer and mixed for 30 min with a rotating speed of 800 rpm, output and then placed in a high-temperature box furnace which was introduced nitrogen for protection, fired at 900° C. for 3 h, naturally cooled to room temperature and output to obtain a SiO/C material.

(3) 1 kg of the $SiO_y$/C material and 20 g of phosphorus pentoxide were fed into a VC mixer, mixed for 40 min, and then taken out to obtain a mixture of SiO/C and phosphorus pentoxide; then the mixture was put into a ball mill tank, 100 g of lithium hydride was added for ball milling for 20 min, and then taken out to obtain a pre-lithiated precursor; the pre-lithiated precursor was subjected to heat treatment under nitrogen protection at 800° C. for 2 h, and then naturally cooled to room temperature, taken out, sieved and demagnetized to obtain an anode material.

The anode material prepared in this example included $SiO_{0.9}$ and $Li_2Si_2O_5$, and the $SiO_{0.9}$ was uniformly dispersed in $Li_2Si_2O_5$. In the anode material, the mass ratio of $SiO_{0.9}$ to $Li_2Si_2O_5$ was 1:2.3. The pH value of the anode material was 10.1. The surface of the anode material was coated with a carbon layer with a thickness of 207 nm.

The conventional performance test results of the anode material prepared in this example are shown in Table 1 and the electrochemical performance test results are shown in Table 2.

Example 10

In this example, the anode material was prepared as follows:

(1) 1 kg of Si powder and 2 kg of $SiO_2$ powder were fed into a VC mixer and mixed for 30 min to obtain a mixture of $SiO_2$ and Si; the mixture was put into a vacuum furnace, heated to 1300° C. while keeping the temperature for 18 h under the negative pressure of 5 Pa; the SiO steam generated in the furnace was rapidly condensed (the condensation temperature was 950° C.) to form a SiO block; after treatment such as crushing, ball milling and grading of the SiO block, a SiO powder material were obtained, wherein the median particle size was controlled at about 6 μm (D10 was 1.5 μm Dmax was 29 μm).

(2) 1.5 kg of the SiO powder material and 113 g of asphalt were placed in a VC mixer and mixed for 30 min with a rotating speed of 800 rpm, output and then placed in a high-temperature box furnace which was introduced nitrogen for protection, fired at 900° C. for 3 h, naturally cooled to room temperature and output to obtain a SiO/C material.

(3) 1 kg of the SiO/C material and 20 g of lithium phosphate were fed into a VC mixer, mixed for 40 min, and then taken out to obtain a mixture of SiO/C and lithium phosphate; then the mixture was put into a ball mill tank, 100 g of lithium hydride was added for ball milling for 20 min, and then taken out to obtain a pre-lithiated precursor; the pre-lithiated precursor was subjected to heat treatment under nitrogen protection at 800° C. for 2 h, and then naturally cooled to room temperature, taken out, sieved and demagnetized to obtain an anode material.

The anode material prepared in this example included $SiO_{0.92}$ and $Li_2Si_2O_5$, and the $SiO_{0.92}$ was uniformly dispersed in $Li_2Si_2O_5$. In the anode material, the mass ratio of $SiO_{0.92}$ to $Li_2Si_2O_5$ was 1:2.9. The pH value of the anode material was 9.9. The surface of the anode material was coated with a carbon layer with a thickness of 250 nm.

The conventional performance test results of the anode material prepared in this example are shown in Table 1 and the electrochemical performance test results are shown in Table 2.

Example 11

In this example, the anode material was prepared as follows:

(1) 1 kg of Si powder and 2 kg of $SiO_2$ powder were fed into a VC mixer and mixed for 30 min to obtain a mixture of $SiO_2$ and Si; the mixture was put into a vacuum furnace, heated to 1300° C. while keeping the temperature for 18 h under the negative pressure of 5 Pa; the SiO steam generated in the furnace was rapidly condensed (the condensation temperature was 950° C.) to form a SiO block; after treatment such as crushing, ball milling and grading of the SiO block, a SiO powder material were obtained, and the median particle size was controlled at about 6 m (D10 was 1.3 μm Dmax was 25 μm).

(2) 1.5 kg of the SiO powder material was placed in CVD rotary furnace, acetylene was introduced as a carbon source, nitrogen was introduced as protective gas. A deposition process was conducted at 800° C. for 70 min, then cooled and output to obtain a SiO/C material.

(3) 1 kg of the SiO/C material and 8 g of NaCl were fed into a VC mixer, mixed for 40 min, and then taken out to obtain a mixture of SiO/C and NaCl; then the mixture was put into a ball mill tank, 100 g of lithium hydride was added for ball milling for 20 min to obtain a pre-lithiated precursor; the pre-lithiated precursor was subjected to heat treatment under nitrogen protection at 800° C. for 2 h, and then naturally cooled to room temperature, taken out, sieved and demagnetized to obtain an anode material.

The anode material prepared in this example included $SiO_{0.9}$ and $Li_2Si_2O_5$, and the $SiO_{0.9}$ was uniformly dispersed in $Li_2Si_2O_5$. In the anode material, the mass ratio of $SiO_{0.9}$ to $Li_2Si_2O_5$ was 1:3.5. The pH value of the anode material was 10.3. The surface of the anode material was coated with a carbon layer with a thickness of 180 nm.

The conventional performance test results of the anode material prepared in this example are shown in Table 1 and the electrochemical performance test results are shown in Table 2.

Example 12

In this example, the anode material was prepared as follows:

(1) 1 kg of Si powder and 2 kg of $SiO_2$ powder were fed into a VC mixer and mixed for 30 min to obtain a mixture of $SiO_2$ and Si; the mixture was put into a vacuum furnace, heated to 1300° C. while keeping the temperature for 18 h under the negative pressure of 5 Pa; the SiO steam generated in the furnace was rapidly condensed (the condensation temperature was 950° C.) to form a SiO block; after treatment such as crushing, ball milling and grading of the SiO block, a SiO powder material were obtained, wherein the median particle size was controlled at about 6 μm (D10 was 1.3 μm Dmax was 25 μm).

(2) 1.5 kg of the SiO powder material was placed in CVD rotary furnace, acetylene was introduced as a carbon source, nitrogen was introduced as protective gas. A deposition process was conducted at 800° C. for 70 min, then cooled and output to obtain a SiO/C material.

(3) 1 kg of the SiO/C material and 30 g of NaCl were fed into a VC mixer, mixed for 40 min, and then taken out to obtain a mixture of SiO/C and NaCl; then the mixture was put into a ball mill tank, 100 g of lithium hydride was added for ball milling for 20 min, and then taken out to obtain a pre-lithiated precursor; the pre-lithiated precursor was subjected to heat treatment under nitrogen protection at 800° C. for 2 h, and then naturally cooled to room temperature, taken out, sieved and demagnetized to obtain an anode material.

The anode material prepared in this example included $SiO_{0.3}$ and $Li_2Si_2O_5$, and the $SiO_{0.3}$ was uniformly dispersed in $Li_2Si_2O_5$. In the anode material, the mass ratio of $SiO_{0.3}$ to $Li_2Si_2O_5$ was 1:0.2. The pH value of the anode material was 10.3. The surface of the anode material was coated with a carbon layer with a thickness of 800 nm.

The conventional performance test results of the anode material prepared in this example are shown in Table 1 and the electrochemical performance test results are shown in Table 2.

Comparative Example 1

(1) 1 kg of Si powder and 2 kg of $SiO_2$ powder were fed into a VC mixer and mixed for 30 min to obtain a mixture of $SiO_2$ and Si; the mixture was put into a vacuum furnace, heated to 1300° C. while keeping the temperature for 18 h under the negative pressure of 5 Pa; the SiO steam generated in the furnace was rapidly condensed (the condensation temperature was 950° C.) to form a SiO block; after treatment such as crushing, ball milling and grading of the SiO block, a SiO powder material were obtained, and the median particle size was controlled at about 6 m (D10 was 1.2 μm Dmax was 28 μm).

(2) 1 kg of the SiO powder material and 20 g of phosphorus pentoxide were taken to obtain a mixture of SiO and phosphorus pentoxide; then the mixture was put into a ball mill tank, 100 g of lithium hydride was added for ball milling for 20 min, and then taken out to obtain a pre-lithiated precursor; the pre-lithiated precursor was subjected to heat treatment under nitrogen protection at 800° C. for 2 h, and then naturally cooled to room temperature, taken out, sieved and demagnetized to obtain an anode material.

The anode material prepared in this example included $SiO_{0.8}$, $Li_2SiO_3$ and $Li_2Si_2O_5$, and the $SiO_{0.8}$ was uniformly dispersed in $Li_2Si_2O_5$. In the anode material, the mass ratio of $SiO_{0.8}$ to $Li_2Si_2O_5$ was 1:2.6. The pH value of the anode material was 11.3.

The conventional performance test results of the anode material prepared in this comparative example are shown in Table 1 and the electrochemical performance test results are shown in Table 2.

Comparative Example 2

In this example, the anode material was prepared as follows:

(1) 1 kg of Si powder and 2 kg of $SiO_2$ powder were fed into a VC mixer and mixed for 30 min to obtain a mixture of $SiO_2$ and Si; the mixture was put into a vacuum furnace, heated to 1300° C. while keeping the temperature for 18 h under the negative pressure of 5 Pa; the SiO steam generated in the furnace was rapidly condensed (the condensation temperature was 950° C.) to form a SiO block; after treatment such as crushing, ball milling and grading of the SiO block, a SiO powder material were obtained, wherein the median particle size was controlled at about 6 μm (D10 was 1.5 μm Dmax was 29 μm).

(2) 1.5 kg of the SiO powder material and 113 g of asphalt were placed in a VC mixer and mixed for 30 min with a rotating speed of 800 rpm, output and then placed in a high-temperature box furnace which was introduced nitrogen for protection, fired at 900° C. for 3 h, naturally cooled to room temperature and output to obtain a SiO/C material.

(3) 1 kg of the SiO/C material and 20 g of phosphorus pentoxide were taken to obtain a mixture of SiO/C and phosphorus pentoxide; then the mixture was put into a ball mill tank, 100 g of lithium hydride was added for ball milling for 20 min, and then taken out to obtain a pre-lithiated precursor; the pre-lithiated precursor was subjected to heat treatment under nitrogen protection at 800° C. for 2 h, and then naturally cooled to room temperature, taken out, sieved and demagnetized to obtain an anode material.

The anode material prepared in this example included $SiO_{0.86}$, $Li_2SiO_3$ and $Li_2Si_2O_5$, and the $SiO_{0.86}$ was uniformly dispersed in $Li_2Si_2O_5$. In the anode material, the mass ratio of $SiO_{0.86}$ to $Li_2Si_2O_5$ was 1:2.2. The pH value of the anode material was 11.2. The surface of the anode material was coated with a carbon layer with a thickness of 220 nm.

Figure 4:
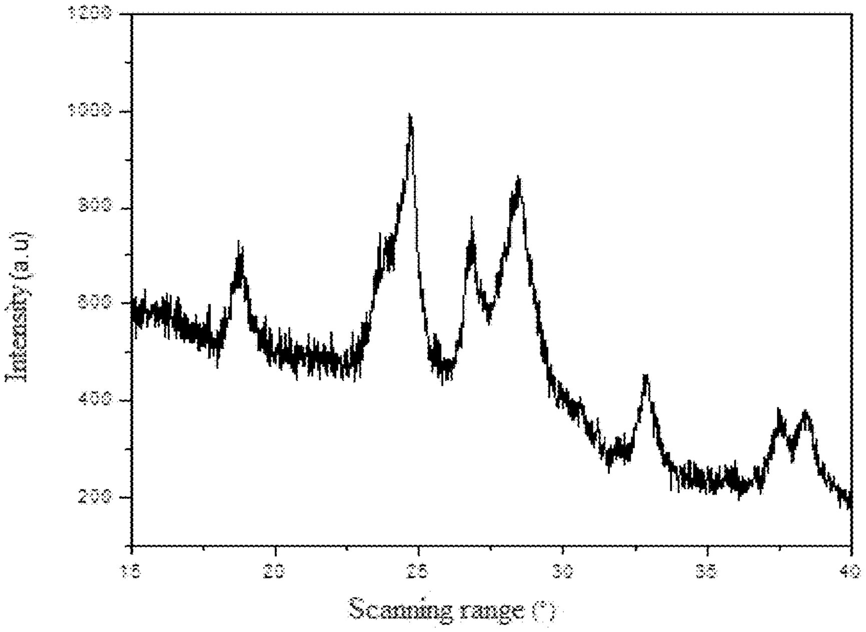
FIG. 4 is an XRD pattern of the anode material prepared in Comparative example 2.

FIG. 4 is a XRD spectrum of the anode material prepared by the comparative example, from which it can be seen that in addition to the characteristic peaks of silicon and $Li_2Si_2O_5$, there is also the characteristic peak of $Li_2SiO_3$ in the spectrum.

FIG. 5*a* is a gas production test photograph of the anode material prepared by the comparative example, from which it can be seen that the sealed aluminum-plastic film bag bulges, indicating that gas production occurs inside.

Figure 5B:
FIG. 5*b* is a coating test photograph of the anode material prepared in Comparative example 2.
Figure 5B:
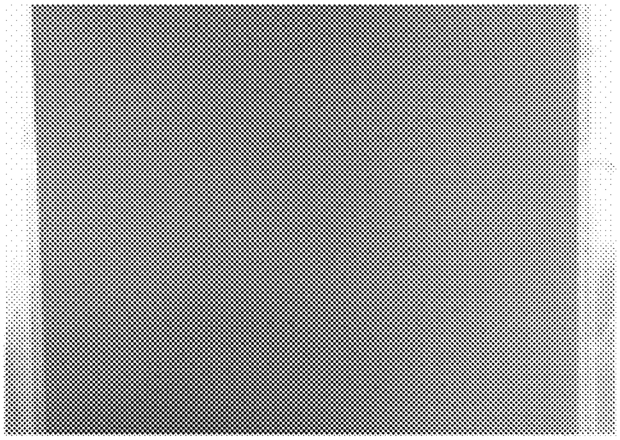

FIG. 5*b* is a coating test photograph of the anode material prepared by the comparative example, from which it can be seen that pinholes are all over the polar plate.

The conventional performance test results of the anode material prepared in this comparative example are shown in Table 1, and the electrochemical performance test results are shown in Table 2.

Comparative Example 3

In this example, the anode material was prepared as follows:

(1) 1 kg of Si powder and 2 kg of $SiO_2$ powder were fed into a VC mixer and mixed for 30 min to obtain a mixture of $SiO_2$ and Si; the mixture was put into a vacuum furnace, heated to 1300° C. while keeping the temperature for 18 h under the negative pressure of 5 Pa; the SiO steam generated in the furnace was rapidly condensed (the condensation temperature was 950° C.) to form a SiO block; after treatment such as crushing, ball milling and grading of the SiO block, a SiO powder material were obtained, wherein the median particle size was controlled at about 6 μm (D10 was 1.3 μm Dmax was 25 μm).

(2) 1.5 kg of the SiO powder material was placed in CVD rotary furnace, acetylene was introduced as a carbon source, nitrogen was introduced as protective gas. A deposition process was conducted at 800° C. for 70 min, then cooled and output to obtain a SiO/C material.

(3) 1 kg of the SiO/C material and 5 g of phosphorus pentoxide were fed into a VC mixer, mixed for 40 min, and then taken out to obtain a mixture of SiO/C and phosphorus pentoxide; then the mixture was put into a ball mill tank, 100 g of lithium hydride was added for ball milling for 20 min, and then taken out to obtain a pre-lithiated precursor; the pre-lithiated precursor was subjected to heat treatment under nitrogen protection at 800° C. for 2 h, and then naturally cooled to room temperature, taken out, sieved and demagnetized to obtain an anode material.

The anode material prepared in this example included $SiO_{0.95}$ and $Li_2Si_2O_5$, and the $SiO_{0.95}$ was uniformly dispersed in $Li_2Si_2O_5$. In the anode material, the mass ratio of $SiO_{0.9}$ to $Li_2Si_2O_5$ was 1:6.1. The pH value of the anode material was 11.0. The surface of the anode material was coated with a carbon layer with a thickness of 200 nm.

The conventional performance test results of the anode material prepared in this comparative example are shown in Table 1, and the electrochemical performance test results are shown in Table 2.

Comparative Example 4

In this example, the anode material was prepared as follows:

(1) 1 kg of Si powder and 2 kg of $SiO_2$ powder were fed into a VC mixer and mixed for 30 min to obtain a mixture of $SiO_2$ and Si; the mixture was put into a vacuum furnace, heated to 1300° C. while keeping the temperature for 18 h under the negative pressure of 5 Pa; the SiO steam generated in the furnace was rapidly condensed (the condensation temperature was 950° C.) to form a SiO block; after treatment such as crushing, ball milling and grading of the SiO block, a SiO powder material were obtained, wherein the median particle size was controlled at about 6 μm (D10 was 1.3 μm Dmax was 25 μm).

(2) 1.5 kg of the SiO powder material was placed in CVD rotary furnace, acetylene was introduced as a carbon source, nitrogen was introduced as protective gas. A deposition process was conducted at 800° C. for 70 min, then cooled and output to obtain a SiO/C material.

(3) 1 kg of the SiO/C material and 10 g of phosphorus pentoxide were fed into a VC mixer, mixed for 40 min, and then taken out to obtain a mixture of SiO/C and phosphorus pentoxide; then the mixture was put into a ball mill tank, 100 g of lithium hydride was added for ball milling for 20 min, and then taken out to obtain a pre-lithiated precursor; the pre-lithiated precursor was subjected to heat treatment under nitrogen protection at 800° C. for 2 h, and then naturally cooled to room temperature, taken out, sieved and demagnetized to obtain an anode material.

The anode material prepared in this example included $SiO_{0.88}$ and $Li_2Si_2O_5$, and the $SiO_{0.88}$ was uniformly dispersed in $Li_2Si_2O_5$. In the anode material, the mass ratio of $SiO_{0.88}$ to $Li_2Si_2O_5$ was 1:5.0. The pH value of the anode material was 11.1. The surface of the anode material was coated with a carbon layer with a thickness of 190 nm.

The conventional performance test results of the anode material prepared in this comparative example are shown in Table 1, and the electrochemical performance test results are shown in Table 2.

Test Method

1. XRD Test:

10 wt % magnesium oxide was added as a standard substance, which was uniformly mixed into the anode materials to be tested prepared in each examples and comparative examples, and then tableted and tested. Angle range: 10°-90°, scan mode: step scanning, selecting a slit width of 1.0, setting a voltage of 40 kW and a current of 40 mA. The relative content of each component was calculated by Jade6.5.

2. Processing Performance Test (1) Gas production test. The anode materials prepared in each examples or comparative examples were used respectively as active materials, SBR+CMC was used as a binder, conductive carbon black was added, and the mixture was stirred and mixed uniformly at a high speed according to the ratio of the active material:the conductive agent:the binder=95:2:3 to obtain a slurry, which was put into an aluminum-plastic film bag for sealing and standing, and then the shape change of the aluminum-plastic film bag was monitored for one month.

(2) Coating test. The slurry prepared in the gas production test was uniformly coated on the copper foil, and whether there were pinholes, pores and pits on the surface of the polar plate after drying was observed.

3. Button Battery Test

The anode materials prepared in each examples or comparative examples were used respectively as active material, SBR+CMC was used as a binder, conductive carbon black was added, and then stirred, prepared slurry and coated on copper foil. Finally, anode plates were prepared by drying and rolling, wherein the ratio of the active material:the conductive agent:the binder was 85:15:10. With a lithium metal sheet as a counter electrode, PP/PE as a separator, LiPF6/EC+DEC+DMC (the volume ratio of EC, DEC and DMC was 1:1:1) as an electrolyte, the dummy batteries were assembled in a glove box filled with argon gas. The electrochemical performance of the button batteries was tested by a LAND 5V/10 mA battery tester, wherein the charging voltage was 1.5V, discharging to 0.01V, and the charging and discharging rate was 0.1 C.

4. Cycle Test

The anode materials prepared in each examples or comparative examples were respectively mixed evenly with graphite according to the mass ratio of 1:9, and then used as active substances. With lithium metal sheet as a counter electrode, PP/PE as a diaphragm, LiPF6/EC+DEC+DMC (the volume ratio of EC, DEC and DMC was 1:1:1) as an electrolyte, the button batteries were assembled in a glove box filled with argon gas. The electrochemical performance of the battery after 50 cycles was tested by a LAND 5V/10 mA battery tester, wherein the charging voltage was 1.5V, discharging to 0.01V, and the charging and discharging rate was 0.1 C.

The results of the above tests are shown in Tables 1 and 2.

TABLE 1

| Sample | Whether coated with carbon | carbon source | Carbon content wt % | Addition amount of the nucleating conversion agent wt % | Addition amount of the heat absorbent wt % | Content of $Li_2SiO_3$ wt % | Content of $Li_2Si_2O_5$ wt %. | Processability: Gas generation | Processability: Coating |
|---|---|---|---|---|---|---|---|---|---|
| Example 1 | No | / | 0 | 2.0 | / | 0 | 65.2 | Can be left for 20 days | normal |
| Example 2 | Yes | acetylene | 5.00 | 2.0 | / | 0 | 68.7 | N | normal |
| Example 3 | Yes | acetylene | 5.01 | 3.0 | / | 0 | 68.7 | N | normal |
| Example 4 | Yes | asphalt | 5.03 | 2.0 | / | 0 | 68.7 | N | normal |
| Example 5 | Yes | methane | 5.00 | 7.0 | / | 0 | 68.7 | N | normal |
| Example 6 | Yes | ethylene | 5.00 | 10.0 | / | 0 | 68.7 | N | normal |
| Example 7 | Yes | asphalt | 5.00 | 2.0 | / | 0 | 68.7 | N | normal |
| Example 8 | Yes | asphalt | 5.00 | 2.0 | / | 0 | 68.7 | N | normal |
| Example 9 | Yes | asphalt | 5.00 | 2.0 (phosphorus trioxide) | / | 0 | 61.5 | N | normal |
| Example 10 | Yes | asphalt | 5.00 | 2.0 (lithium phosphate) | / | 0 | 60.1 | N | normal |
| Example 11 | Yes | acetylene | 4.95 | / | 8 | 0 | 68.7 | N | normal |
| Example 12 | Yes | acetylene | 8.0 | / | 30 | 0 | 71.2 | N | normal |
| Comparative example 1 | Yes | asphalt | 5.01 | / | / | 15.9 | 42.8 | Gas production after 3 days | pinhole |
| Comparative example 2 | Yes | asphalt | 5.01 | / | / | 15.9 | 42.8 | Gas production after 3 days | pinhole |
| Comparative example 3 | Yes | acetylene | 4.95 | 0.5 | / | 10.2 | 51.7 | Can be left for 7 days | A few pinholes |
| Comparative example 4 | Yes | acetylene | 5.06 | 1.0 | / | 5.1 | 60.2 | Can be left for 15 days | Partial pinhole |

TABLE 2

| Experiment | Discharge capacity mAh/g | Initial efficiency % | 50-week capacity retention rate % |
|---|---|---|---|
| Example 1 | 1308 | 86.5 | 88.8 |
| Example 2 | 1417 | 88.9 | 89.1 |
| Example 3 | 1420 | 89.5 | 90.5 |
| Example 4 | 1411 | 88.6 | 90.0 |
| Example 5 | 1400 | 88.3 | 89.1 |
| Example 6 | 1404 | 86.5 | 89.4 |
| Example 7 | 1415 | 88.4 | 90.2 |
| Example 8 | 1407 | 90.5 | 90.1 |
| Example 9 | 1388 | 87.0 | 88.8 |
| Example 10 | 1380 | 87.2 | 88.9 |
| Example 11. | 1394 | 88.8 | 90.0 |
| Example 12 | 1405 | 89.7 | 91.8 |
| Comparative example 1 | 1720 | 76.8 | 75.8 |
| Comparative example 2 | 1720 | 76.8 | 75.8 |
| Comparative example 3 | 1401 | 86.7 | 82.2 |
| Comparative example 4 | 1421 | 86.5 | 84.6 |

According to Table 1 and Table 2, it can be seen from Example 2, Example 3, Comparative example 3 and Comparative example 4 that with the increase of the addition amount of $P_2O_5$, the content of $Li_2SiO_3$ gradually decreases. When the addition amount reaches 2%, $Li_2SiO_3$ no longer exists, and the processability of the materials is improved. It can be seen from Examples 1, 2 and 4 that the pre-lithiation reaction after carbon coating and the addition of the nucleating conversion agent can obtain better conversion effect, and the type of the carbon source has no influence on the conversion effect of $Li_2SiO_3$.

Generally speaking, with the increase of $Li_2Si_2O_5$ content in the anode material, the cycle performance of the anode material is obviously improved after adding the nucleating conversion agent. When $Li_2SiO_3$ is completely transformed into $Li_2Si_2O_5$, the cycle retention rate of the material is stable above 88%.

Examples 9-10 did not use the nucleating conversion agent $P_2O_5$, but used other kinds of nucleating conversion agents. Compared with Example 4, the capacity and cycle of the materials prepared in Examples 9 and 10 are worse than those added with $P_2O_5$, which may be caused by different kinds of conversion agents. Because $P_2O_5$ has a more remarkable effect on the transform of $Li_2SiO_3$ to $Li_2Si_2O_5$, and the content of $Li_2Si_2O_5$ in the material is also much more after $P_2O_5$ is added, which has a stronger inhibitory effect on the expansion brought by the cyclic process.

A heat absorbent was added in Examples 11-12, which promoted the transformation of $Li_2SiO_3$ in a high temperature phase to $Li_2Si_2O_5$ in a low temperature phase, and also made the final product only contain $Li_2Si_2O_5$, and thus show good initial coulombic efficiency and cycle performance.

No nucleating conversion agent was added in Comparative example 1 on the basis of Example 1, which led to a higher content of $Li_2SiO_3$, poor processability, more gas production, obvious pinhole after coating, and the initial efficiency and cycle performance were obviously inferior to those of Example 1. The situation of Comparative Example 2 was the same as that of Comparative Example 1, that is, no nucleating conversion agent was added, which led to poor product processability, more gas production, obvious pinhole after coating, and inferior initial efficiency and cycle performance as compared with Example 4.

In Comparative Examples 3 and 4, the addition amount of the nucleating conversion agent was changed on the basis of Example 2, and the mass ratios of silicon oxide to nucleating conversion agent were 100:0.5 and 100:1, respectively. The nucleating conversion agents in Comparative Examples 3-4 were insufficient, which could not completely transform $Li_2SiO_3$ into $Li_2Si_2O_5$, resulting in poor processability of the material, gas production after standing and pinhole during coating.

The applicant declares that the specific methods of the present application are illustrated by the above-mentioned embodiments, but the present application is not limited to the above-mentioned specific methods, i.e., it is not intended that the present application can only be implemented by relying on the above-mentioned specific methods. It should be clear to those skilled in the art that any improvement to the present application, equivalent replacement of raw material, addition of auxiliary components, selection of specific methods, etc., fall within the scope of protection and disclosure of the present application.

What is claimed is:

1. An anode material, comprising $SiO_x$ and $Li_2Si_2O_5$, wherein the $SiO_x$ is dispersed in the $Li_2Si_2O_5$, and wherein $0<x\leq1.2$, wherein a mass ratio of the $SiO_x$ to the $Li_2Si_2O_5$in the anode material is 1:(0.74-6.6);

wherein the $Li_2Si_2O_5$accounts for a content of 60.1 wt % to 71.2 wt % in the anode material; and wherein a pH value of the anode material meets 7<pH<10.7.

2. The anode material according to claim 1, wherein the anode material satisfies at least one of the following conditions a and b:

a. an average particle size of the anode material is 5μm-50μm; and b. the $SiO_x$ is uniformly dispersed in the $Li_2Si_2O_5$.

3. The anode material according to claim 1, wherein the anode material satisfies at least one of the following conditions a to c:

a. a carbon coating layer is formed on a surface of the anode material;

b. a carbon coating layer is formed on the surface of the anode material, and a thickness of the carbon coating layer is 10 nm-2000 nm; and c. a carbon coating layer is formed on the surface of the anode material, and a mass fraction of a carbon element in the anode material is 4%-6%.

4. A method for preparing the anode material according to claim 1, comprising the following steps:

mixing a silicon oxide $SiO_y$, a reducing lithium-containing compound and an auxiliary agent, and performing heat treatment to obtain the anode material, wherein the auxiliary agent comprises a nucleating conversion agent or a heat absorbent, and 0<y<2.

5. The method according to claim 4, wherein the anode material satisfies at least one of the following conditions a to f:

a. a pH value of the anode material meets 7<pH<10.7;

b. an average particle size of the anode material is 5μm-50μm;

c. a mass ratio of the $SiO_x$ to the $Li_2Si_2O_5$in the anode material is 1:(0.74-6.6).

d. a carbon coating layer is formed on a surface of the anode material;

e. a carbon coating layer is formed on the surface of the anode material, and a thickness of the carbon coating layer is 10 nm to 2000 nm; and f. a carbon coating layer is formed on the surface of the anode material, and a mass fraction of a carbon element in the anode material is 4%-6%.

6. The method according to claim 4, wherein the method satisfies at least one of the following conditions a to d:

a. a mass ratio of the silicon oxide to the reducing lithium-containing compound is 10:(0.08-1.2);

b. the silicon oxide is silicon monoxide;

c. the silicon oxide is has a D10>1.0 μm and a Dmax<50 μm; and d. the reducing lithium compound comprises at least one of lithium hydride, alkyl lithium, metallic lithium, lithium aluminum hydride, lithium amide or lithium borohydride.

7. The method according to claim 4, wherein the method satisfies at least one of the following conditions a to h:

a. the nucleating conversion agent comprises at least one of phosphorus oxide and phosphate;

b. the phosphorus oxide comprises at least one of phosphorus pentoxide and phosphorus trioxide;

c. the phosphate comprises at least one of lithium phosphate, magnesium phosphate and sodium phosphate;

d. the nucleating conversion agent is phosphorus pentoxide;

e. a melting point of the heat absorbent is less than 700° C.;

f. the heat absorbent comprises at least one of LiCl, NaCl, $NaNO_3$, $KNO_3$, KOH, BaCl, KCl and LiF;

g. a mass ratio of the silicon oxide to the nucleating conversion agent is 100:(2-10); and h. a mass ratio of the silicon oxide to the heat absorber is 100:(8-30).

8. The method according to claim 4, wherein the method satisfies at least one of the following conditions a to d:

a. the heat treatment is carried out in a non-oxidizing atmosphere;

b. the heat treatment is carried out in a non-oxidizing atmosphere; the non-oxidizing atmosphere comprises at least one of hydrogen, nitrogen, helium, neon, argon, krypton and xenon;

c. a temperature of the heat treatment is 300° C.-1000° C.; and d. a time of the heat treatment is 1.5 h to 2.5 h.

9. The method according to claim 4, wherein before mixing the silicon oxide $SiO_y$, the reducing lithium-containing compound and the nucleating conversion agent or the heat absorbent, the method further comprises:

heating and gasifying a raw material of the silicon oxide to generate a silicon oxide gas, condensing and shaping to obtain the silicon oxide $SiO_y$, wherein $0<y<2$.

10. The method according to claim 9, wherein the method satisfies at least one of the following conditions a to g:

a. the raw material of the silicon oxide include silicon and silicon dioxide;

b. a mass ratio of the silicon to the silicon dioxide is 1:(1.8-2.2);

c. a temperature of the heating and gasifying is 1200° C.-1400° C.;

d. a time for the heating and gasifying is 16 h to 20 h;

e. a temperature for the condensing is 930° C.-970° C.;

f. the heating and gasifying is carried out in a protective atmosphere or vacuum; and g. the shaping comprises at least one of crushing, ball milling or grading.

11. The method according to claim 4, further comprising:

performing carbon coating on a material to be coated with carbon, wherein the material to be coated with carbon comprises at least one of the silicon oxide and the anode material.

12. The method according to claim 11, wherein the method satisfies at least one of the following conditions a to c:

a. the carbon coating comprises at least one of gas-phase carbon coating and solid-phase carbon coating;

b. the carbon coating comprises at least one of gas-phase carbon coating and solid-phase carbon coating, and the conditions of the gas-phase carbon coating are as follows: heating the silicon oxide to 600° C.-1000° C. in a protective atmosphere, introducing an organic carbon source gas, keeping the temperature for 0.5 h-10 h, and then cooling; wherein the organic carbon source gas comprises hydrocarbons, and the hydrocarbons comprise at least one of methane, ethylene, acetylene and benzene; and c. the carbon coating comprises at least one of gas-phase carbon coating and solid-phase carbon coating, and the conditions of the solid-phase carbon coating are as follows: blending the silicon oxide and a carbon source for 0.5 h to 2 h, and then carbonizing the obtained carbon mixture for 2 h to 6 h at 600° C.-1000° C., and cooling; wherein the carbon source comprises at least one of polymers, saccharides, organic acids or asphalt.

13. The method according to claim 4, further comprising the following steps:

heating and gasifying silicon and silicon dioxide in a mass ratio of 1:(1.8-2.2) at 1200° C.-1400° C. in vacuum for 16 h-20 h, condensing at 930° C.-970° C., and shaping to obtain silicon monoxide;

performing carbon coating on the silicon monoxide to obtain carbon-coated silicon monoxide;

mixing the carbon-coated silicon oxide and phosphorus pentoxide according to a mass ratio of 100:(2-10), adding a reducing lithium-containing compound and mixing, and roasting at 450° C.-800° C. for 1.5 h-2.5 h in a non-oxidizing atmosphere to obtain the anode material;

wherein a mass ratio of the carbon-coated silicon monoxide to the reducing lithium-containing compound is 10:(0.08-1.2).

14. A lithium ion battery, comprising the anode material according to claim 1.

* * * * *